United States Patent
Kussmaul

(10) Patent No.: US 11,314,795 B2
(45) Date of Patent: *Apr. 26, 2022

(54) USER NAVIGATION IN A TARGET PORTAL

(71) Applicant: International Business Machines Corporation, Armonk, NY (US)

(72) Inventor: Timo Kussmaul, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 121 days.

This patent is subject to a terminal disclaimer.

(21) Appl. No.: 16/858,847

(22) Filed: Apr. 27, 2020

(65) Prior Publication Data
US 2020/0257711 A1  Aug. 13, 2020

Related U.S. Application Data

(63) Continuation of application No. 16/135,343, filed on Sep. 19, 2018, now Pat. No. 10,671,655, which is a (Continued)

(30) Foreign Application Priority Data

Nov. 5, 2014 (GB) ..................... 1419728

(51) Int. Cl.
  *G06F 16/33* (2019.01)
  *G06F 16/903* (2019.01)
  (Continued)

(52) U.S. Cl.
  CPC ......... *G06F 16/334* (2019.01); *G06F 16/903* (2019.01); *G06F 16/9024* (2019.01); *G06F 16/9566* (2019.01)

(58) Field of Classification Search
  CPC .. G06F 16/334; G06F 16/903; G06F 16/9566; G06F 16/9024
  See application file for complete search history.

(56) References Cited

U.S. PATENT DOCUMENTS

| | | | | |
|---|---|---|---|---|
| 7,653,659 B2 * | 1/2010 | Kussmaul | ............ | G06F 16/958 707/999.107 |
| 7,870,250 B2 * | 1/2011 | Nauerz | ................. | G06Q 10/06 709/224 |

(Continued)

OTHER PUBLICATIONS

Anonymous, "Method and System for Dynamically Federating, Displaying and Using Tags Associated with Social Objects in the Context of Web Portals," IP.com Disclosure No. IPCOM000230033D, Aug. 15, 2013, pp. 1-7.

(Continued)

*Primary Examiner* — Baoquoc N To
(74) *Attorney, Agent, or Firm* — Heslin Rothenberg Farley & Mesiti P.C.; Alexander Jochym, Esq.

(57) ABSTRACT

User navigation in a target portal with at least two portal pages. At least one query is created that includes uniform resource locators (URLs) of selected portal pages as search terms in a first search level; repeating until a certain abort criterion is reached: Receiving and analyzing search results of the at least one query including external websites containing search terms as part of their content; selecting a set of uniform resource locators from the received search results; creating a node in a graph-like-model for each selected URL if not already contained in the graph-like-model and associating the node with the selected uniform resource locator; creating and issuing a further search query including selected uniform resource locators of external websites in an additional search level; and in case the certain abort criterion is reached, performing a number of actions.

20 Claims, 10 Drawing Sheets

Related U.S. Application Data continuation of application No. 14/926,979, filed on Oct. 29, 2015, now Pat. No. 10,255,350.

(51) Int. Cl.
 *G06F 16/901* (2019.01)
 *G06F 16/955* (2019.01)

(56) References Cited

U.S. PATENT DOCUMENTS

| | | |
|---|---|---|
| 8,117,529 B2 | 2/2012 | Melamed et al. |
| 8,423,527 B2 | 4/2013 | Roy-Chowdhury et al. |
| 8,510,682 B2* | 8/2013 | Kusterer ............ G06F 3/0481 |
| | | 715/854 |
| 9,262,915 B2* | 2/2016 | Clem ................ G08G 1/148 |
| 9,866,638 B2* | 1/2018 | Heymann ............ H04L 67/14 |
| 10,255,350 B2 | 4/2019 | Kussmaul |
| 2004/0083428 A1* | 4/2004 | Slade ................ G06F 16/954 |
| | | 715/205 |
| 2007/0214421 A1* | 9/2007 | Jolley ................ G06F 21/604 |
| | | 715/742 |
| 2010/0064040 A1 | 3/2010 | Wise et al. |
| 2010/0217777 A1 | 8/2010 | Kussmaul |
| 2013/0238583 A1 | 9/2013 | Lehmann et al. |
| 2014/0335897 A1 | 11/2014 | Clem et al. |
| 2019/0018892 A1 | 1/2019 | Kussmaul |

OTHER PUBLICATIONS

Klaassen, Rob, et al., "Designing Government Portal Navigation Around Citizens' Needs," Lecture Notes in Computer Science vol. 4084, Sep. 2006, pp. 162-173.

List of IBM Patents or Patent Applications Treated as Related, May 15, 2020, 2 pages.

\* cited by examiner

USER NAVIGATION IN A TARGET PORTAL

PRIOR FOREIGN APPLICATION

This application claims priority from the United Kingdom patent application number 1419728.9, filed Nov. 5, 2014, which is hereby incorporated herein by reference in its entirety.

BACKGROUND

One or more aspects relate in general to the field of internet portals, and in particular, to user navigation in a target portal.

There are various techniques to automatically adapt a portal to user behavior, e.g. navigation behavior, as well as administrator behavior, such as portal model changes, user context or according to a semantic analysis of portal content.

SUMMARY

Shortcomings of the prior art are overcome and additional advantages are provided through the provision of a method of user navigation in a target portal with at least two portal pages. The method includes, for instance, creating at least one query including at least one of uniform resource locators of selected portal pages or content of selected portal pages as search terms in a first search level; repeating until a certain abort criterion is reached: receiving and analyzing search results of the at least one query including external websites containing search terms as part of their content; selecting a set of uniform resource locators from the received search results; creating a node in a graph-like-model for each uniform resource locator of the selected set of uniform resource locators, based on the node not already being contained in the graph-like-model and associating the node with the uniform resource locator; creating and issuing a further search query including selected uniform resource locators of external websites in an additional search level; based on reaching the certain abort criterion performing: computing the graph-like-model containing nodes and edges representing direct or indirect references between the external websites and portal pages of the target portal based on the created nodes; defining a threshold value for a maximum distance for pairs of portal pages in the graph-like-model; calculating distances in said graph-like-model for the pairs of portal pages of the target portal; comparing the calculated distances for the pairs of portal pages with the defined threshold value; creating an additional navigation path for pairs of portal pages whose distance is smaller than the threshold value; and displaying the additional navigation path in the target portal.

Computer program products and systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

Embodiments of the present invention, as described in detail below, are shown in the drawings, in which.

DETAILED DESCRIPTION

Figure 1:
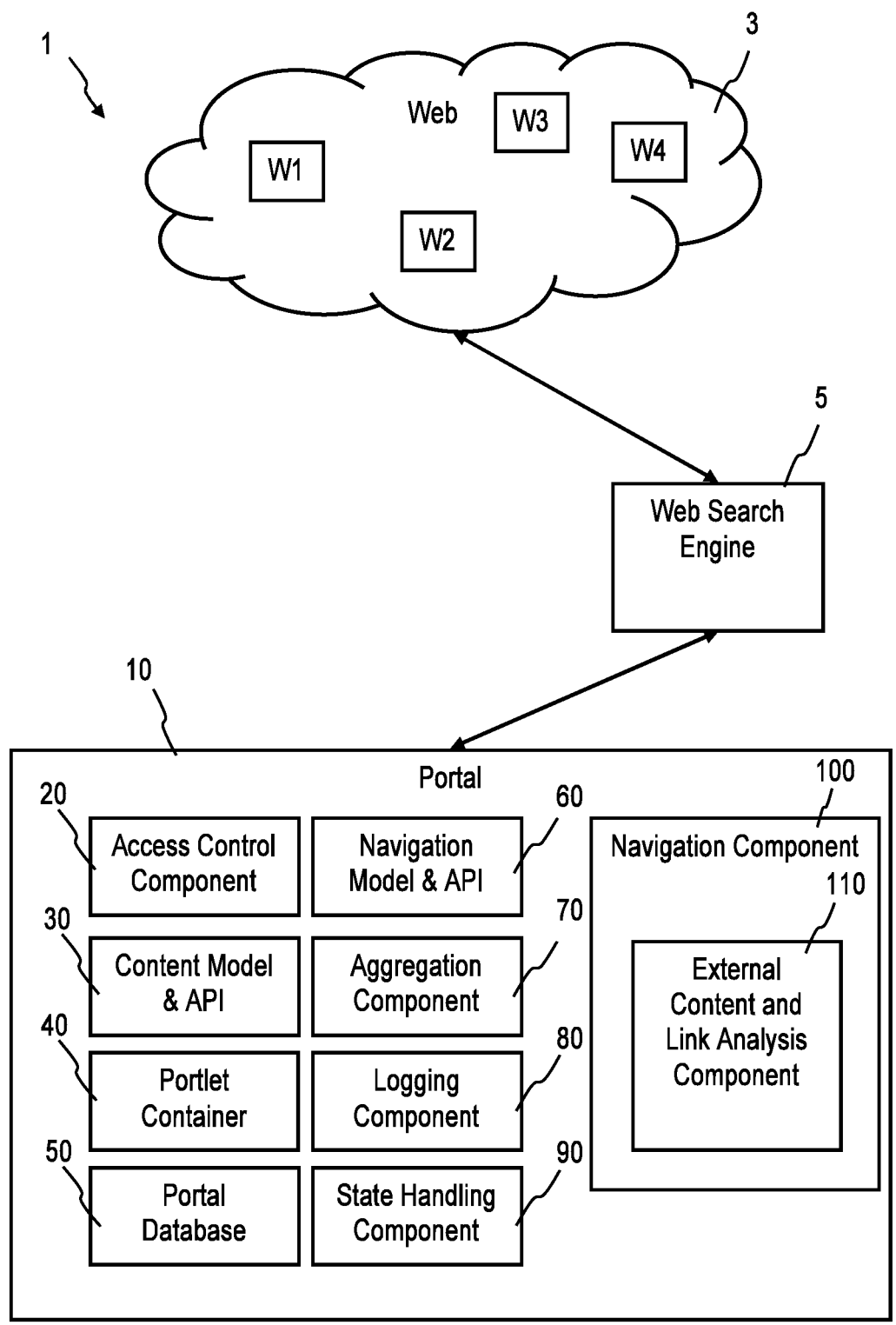
FIG. 1 is a schematic block diagram of a web structure including a target portal, in accordance with an embodiment of the present invention.

Although there are techniques to adapt a portal to user behavior, there is no technique to adapt and enhance the portal user experience by using the knowledge that is implicitly contained in the hyperlink structure between external websites, i.e. non-portal web sites, and pages of a target portal.

In an example scenario, a service provider offers, e.g. ordering, order approval, as well as expense management functionality for clients through a portal. An experienced user of these services provides the user's knowledge about the various tasks and procedures in a blog or a website, including links to the portal pages that contain the portlets that are relevant for the separate sub-tasks. Other users find this information helpful and comment and/or follow via Twitter, blogs etc. But the user is not able to provide the expertise directly in the portal, since the user is not employed by the service provider.

In a hyperlink structure between various external web pages and a portal, multiple links are pointing to different portal pages. The beholder of the hyperlink structure may recognize that the hyperlink structure between the external web sites and the portal pages represents valuable knowledge, e.g. about the portal pages that are related in order to perform a certain task. Currently the information from the expert user website is helpful only for those portal users that are lucky enough to find the document. Users who do not find the document do not benefit from the information. In the portal navigation, the portal pages are not located nearby, and there are no clearly evident navigation paths between these pages, which make it hard for users to find the resources for completing their task. In other words, the portal currently is not optimally designed for these users.

Therefore, in accordance with one or more aspects of the present invention, a method for user navigation in a target portal and a corresponding facility for user navigation in a target portal are provided, which are able to improve user experience with internet portals and to simplify navigation within the target portal.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
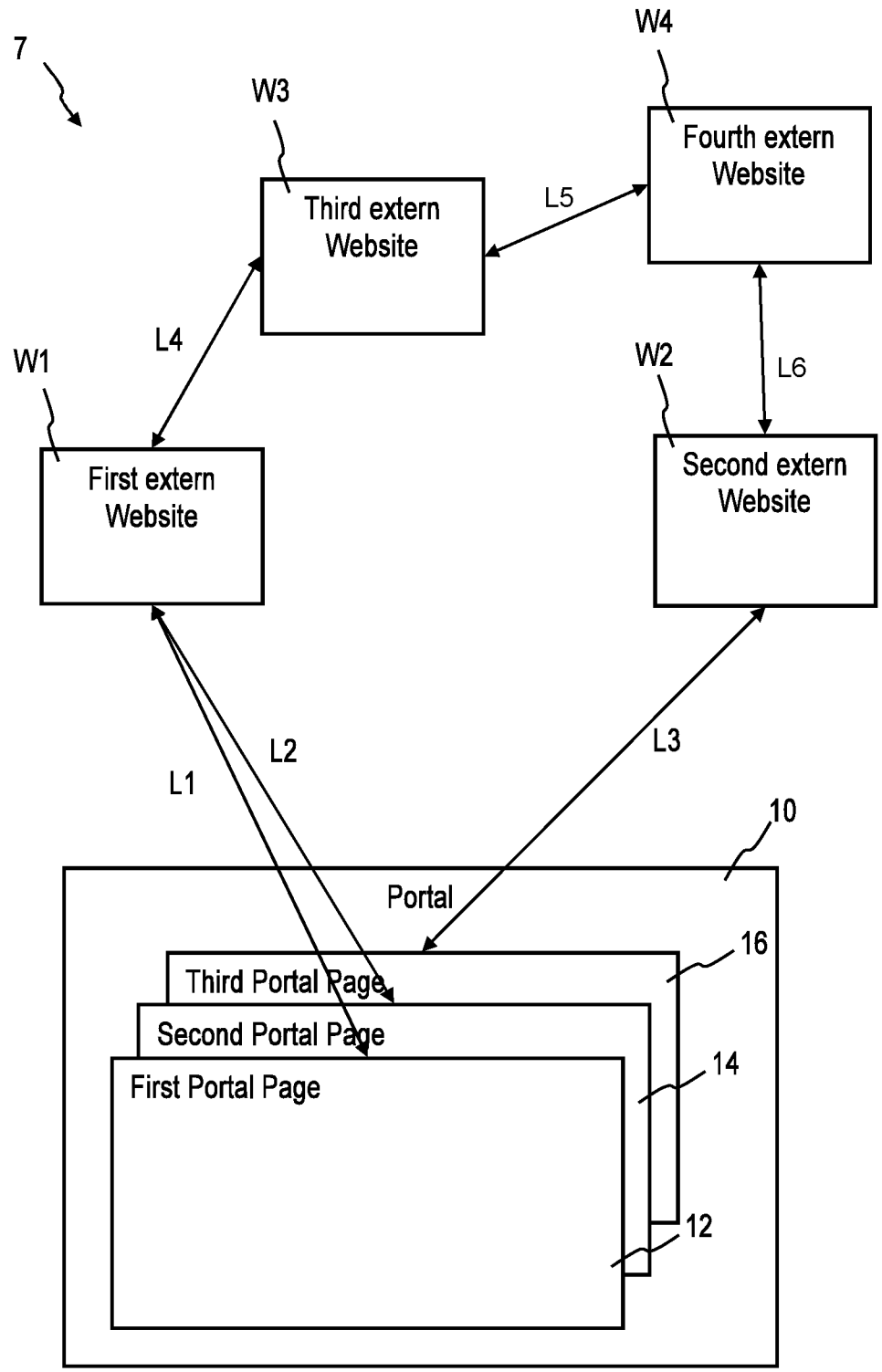
FIG. 2 is a schematic block diagram of a link structure between various external web sites, i.e. non-portal web sites, and the target portal.

FIG. 1 shows an embodiment of a web structure 1 including a web 3 with various web sites W1, W2, W3, W4, a web search engine 5 and a target portal 10, in accordance with an embodiment of the present invention; and FIG. 2 shows a link structure 7 of the web structure 1 of FIG. 1 between the various external websites W1, W2, W3, W4 and the target portal 10.

Referring to FIGS. 1 and 2, the shown embodiment of the present invention employs a facility for user navigation in target portal 10 with at least two portal pages 12, 14, 16 comprising a navigation component 100 with an external content and link analysis component 110. The navigation component 100 with the external content and link analysis component 110 automatically finds and analyzes relevant extern websites W1, W2, W3, W4, i.e. non-portal websites, and adapts a portal navigation according to the results of the analysis. Therefore, the navigation component 100 with the external content and link analysis component 110 performs a method for user navigation in a target portal, in accordance with an embodiment of the present invention.

The navigation component 100 performs, e.g., creating at least one query including uniform resource locators (URLs) of selected portal pages 12, 14, 16, referenced by links L1, L2, L3, for example, and/or content of selected portal pages 12, 14, 16 as search terms in a first search level; and issuing the at least one query to at least one web search engine 5. The content of selected portal pages 12, 14, 16 in the at least one search term comprises page titles, sub-titles and/or keywords, for example. The navigation component 100 repeats the following until a certain abort criterion is reached: Receiving and analyzing search results including external websites W1, W2, W3, W4 containing search terms as part of their content; selecting a set of uniform resource locators (URLs) from a returned search result; creating a node A, B, C, D in a graph-like-model 9, shown in FIGS. 9 to 15, for each selected uniform resource locators (URLs) if not already contained in the graph-like-model 9 and associating the node A, B, C, D with the selected uniform resource locator (URL); creating and issuing a new search query including selected uniform resource locators (URLs) of external websites W1, W2, W3, W4 in an additional search level. In case the certain abort criterion is reached, the navigation component 100 performs the following: Computing the graph-like-model 9 containing nodes A, B, C, D and edges E1 to E6 representing direct or indirect references between the external websites W1, W2, W3, W4 and portal pages 12, 14, 16 of the target portal 10 based on the created nodes A, B, C, D; defining a threshold value for a maximum distance between pairs of portal pages 12, 14, 16 in the graph-like-model 9; calculating distances in the graph-like-model 9 between the pairs of portal pages 12, 14, 16 of the target portal 10; comparing the calculated distance with the defined threshold value; creating an additional navigation path between pairs of portal pages 12, 14, 16 whose distance is smaller than the threshold value; and displaying the additional navigation path in the target portal 10. The navigation component 100 may use a markup parser to parse a markup of a corresponding page W1, W2, W3, W4.

In the shown embodiment, the target portal 10 comprises, beside the navigation component 100, multiple state of the art components like an access control component 20, a content model and application programming interface (API) 30, a portlet container 40, a portal database 50, a navigation model and application programming interface (API) 60, an aggregation component 70, a logging component 80 and a state handling component 90. The access control component 20 manages the access rights and controls the access to the portal artifacts, especially to the portal pages 12, 14, 16. The content model and application programming interface (API) 30 manages the structure and content, e.g. portlets, of the portal pages 12, 14, 16. The portlet container 40 executes portlets of the portal pages 12, 14, 16. Portlets are software components creating markup fragments and arranged on portal pages 12, 14, 16 to create parts of the portal pages 12, 14, 16. The portal database 50 holds portal data. The navigation model and application programming interface (API) 60 manages data concerning navigation paths inside the target portal 10. The aggregation component 70 renders the portal pages 12, 14, 16, wherein markup fragments of the different portlets of a corresponding portal page 12, 14, 16 are aggregated and additional markups like navigation paths, menus, titles etc. are created. The logging component 80 stores user actions in the portal. The state handling component 90 manages different states of the target portal 10. The functioning and modes of operating these state of the art components are well known to a skilled person, so a detailed description of these components is omitted.

Referring to FIG. 2, the shown example simple hyperlink structure 7 between four external web pages W1, W2, W3, W4, i.e. non-portal web pages, and the target portal 10 comprising three portal pages 12, 14, 16 displays a first link L1 between a first portal page 12 and a first extern website W1, a second link L2 between a second portal page 14 and the first extern website W1, a third link L3 between a third portal page 16 and a second extern website W2, a fourth link L4 between the first extern website W1 and a third extern website W3, a fifth link L5 between the third extern website W3 and a fourth extern website W4, and a sixth link L6 between the second extern website W2 and the fourth extern website W4.

Figure 3:
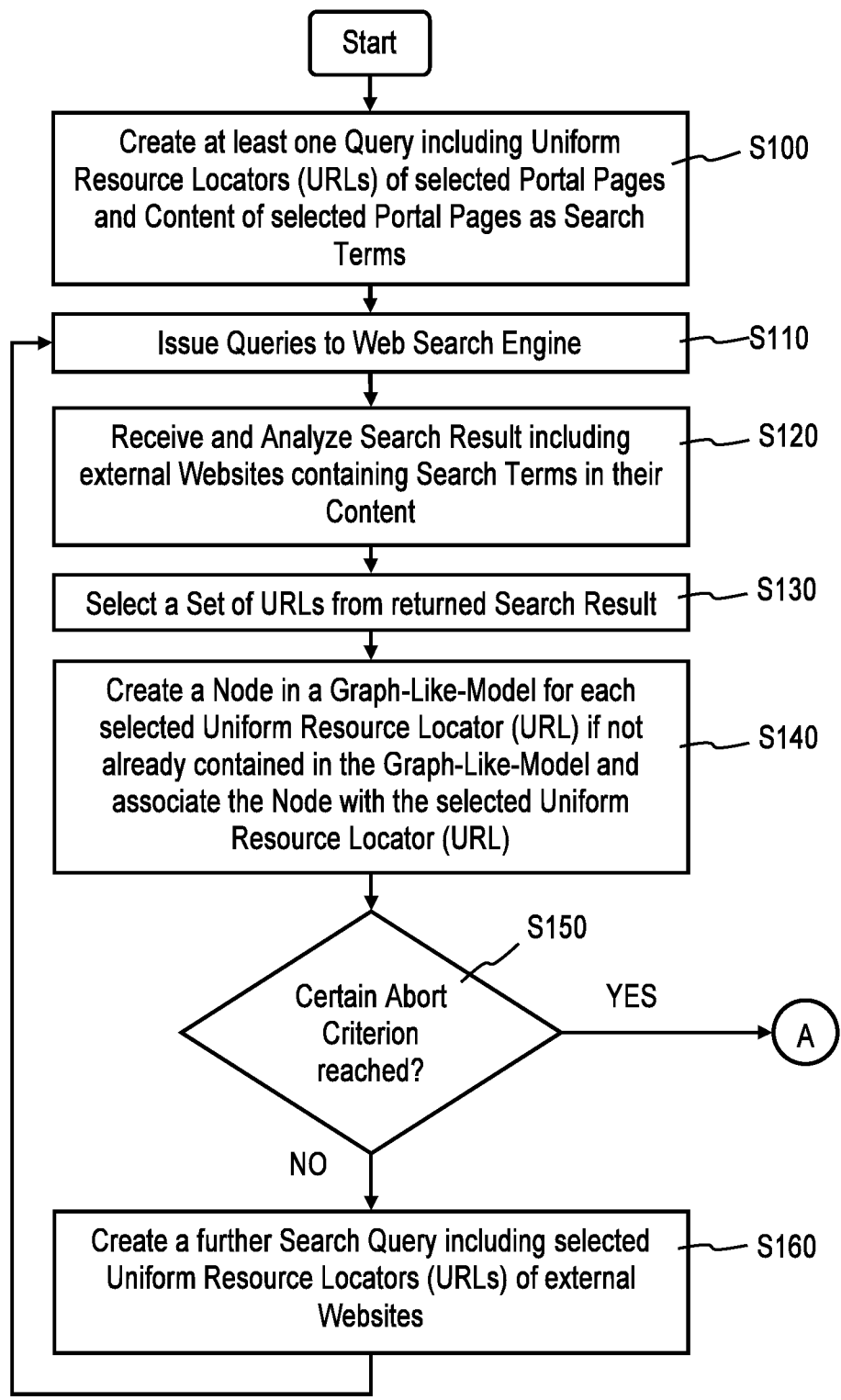
FIGS. 3 and 4 are together a schematic flow diagram of a method for user navigation in a target portal, in accordance with an embodiment of the present invention.
Figure 4:
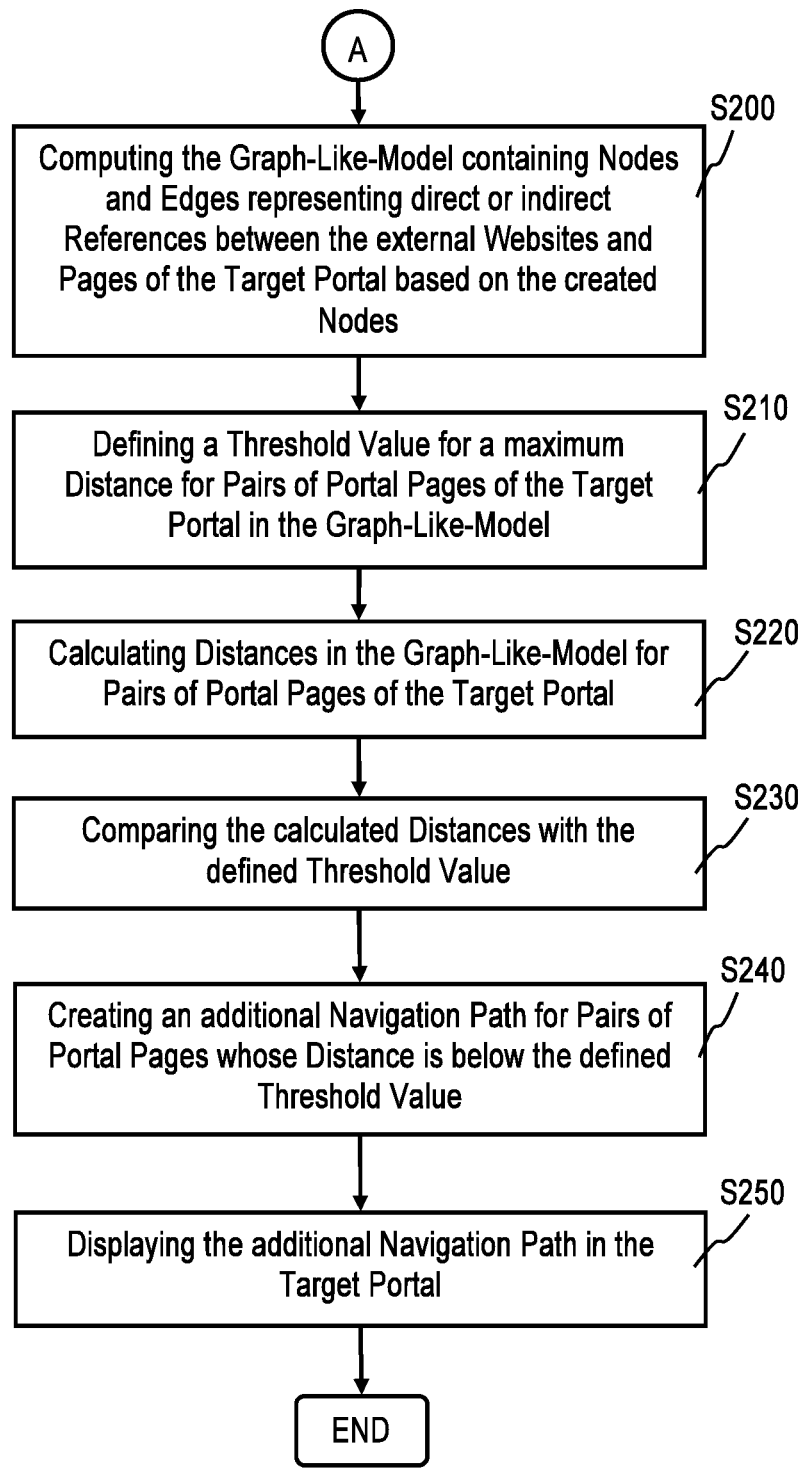
Figure 5:
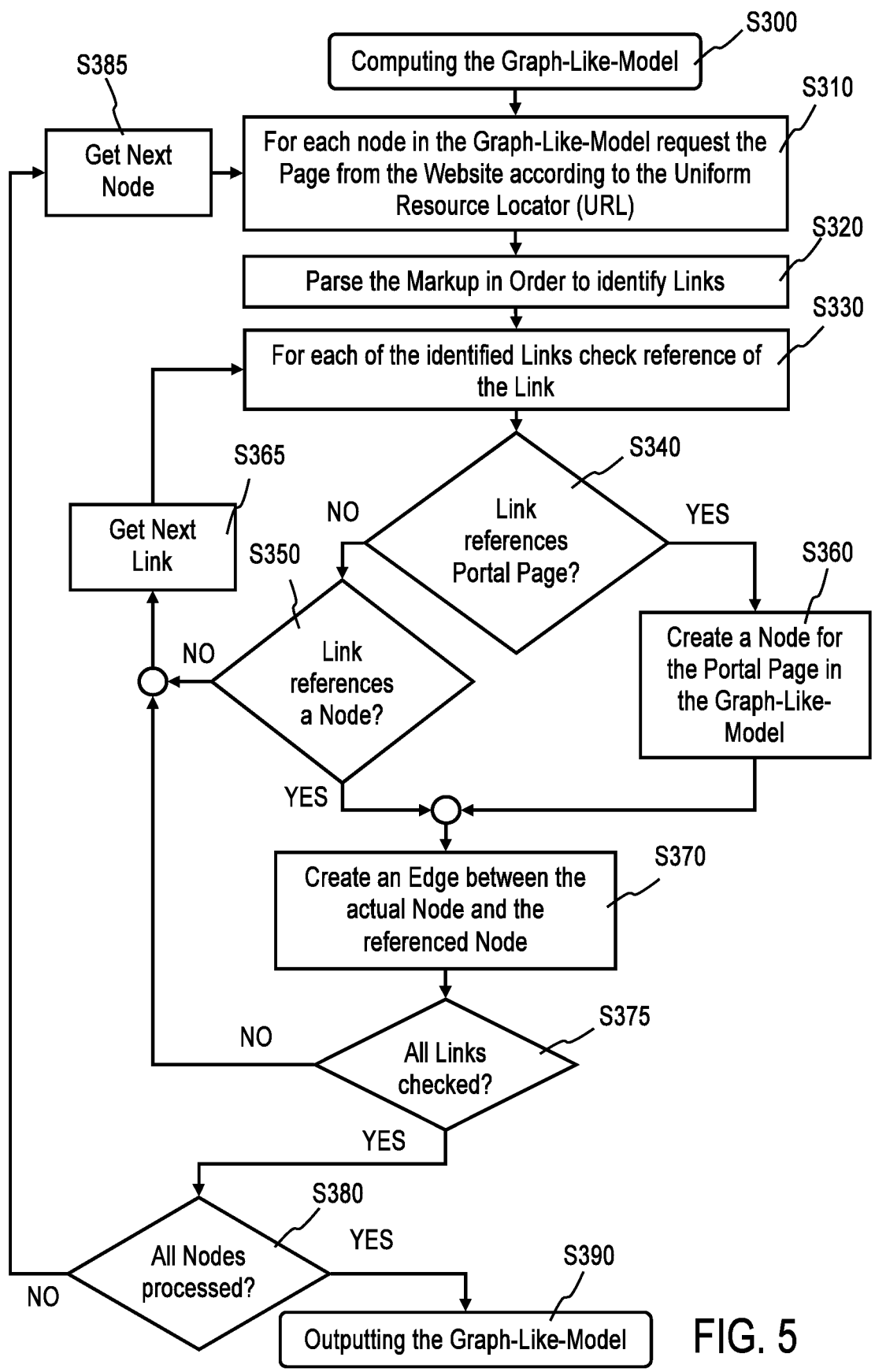
FIG. 5 is a schematic flow diagram of a process for computing a graph-like-model used by the method for user navigation in a target portal of FIGS. 3 and 4, in accordance with an embodiment of the present invention.
Figure 6:
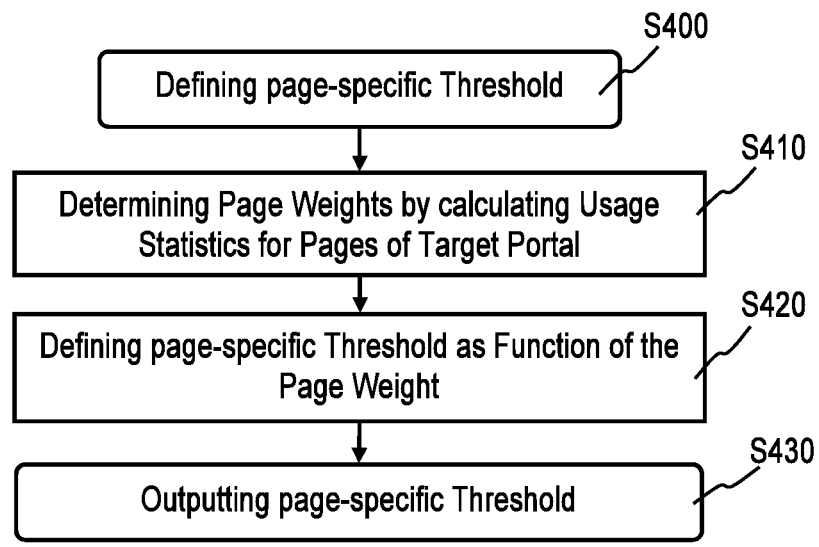
FIG. 6 is a schematic flow diagram of a process for defining a page-specific threshold used by the method for user navigation in a target portal of FIGS. 3 and 4, in accordance with an embodiment of the present invention.
Figure 7:
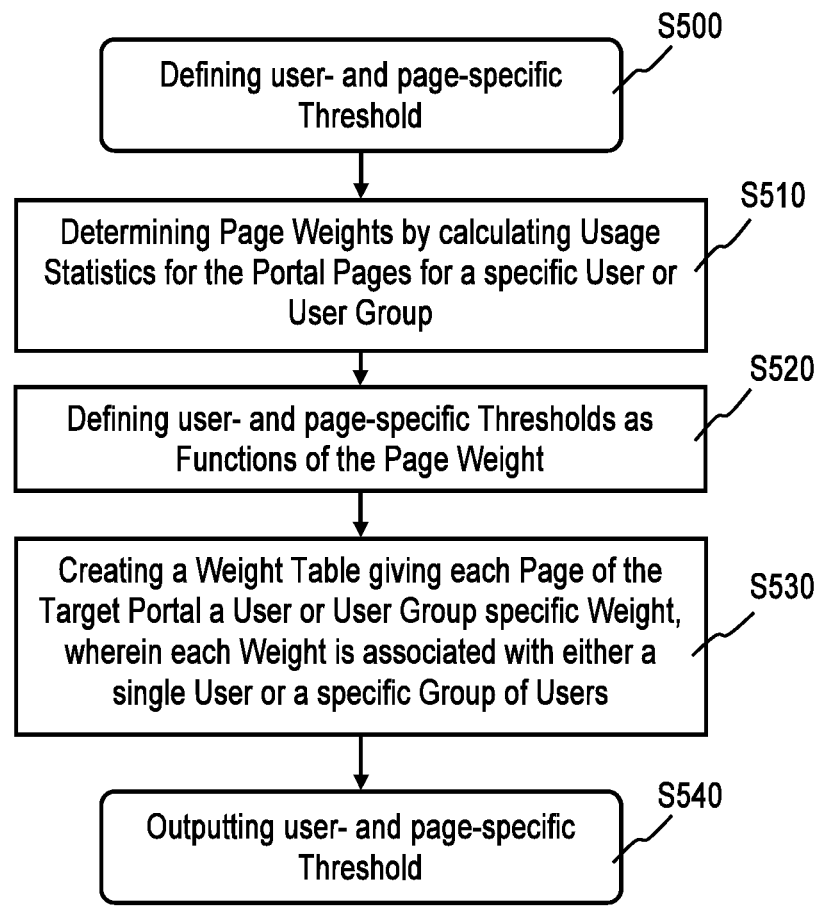
FIG. 7 is a schematic flow diagram of a process for defining a user- and page-specific threshold used by the method for user navigation in a target portal of FIGS. 3 and 4, in accordance with an embodiment of the present invention.
Figure 8:
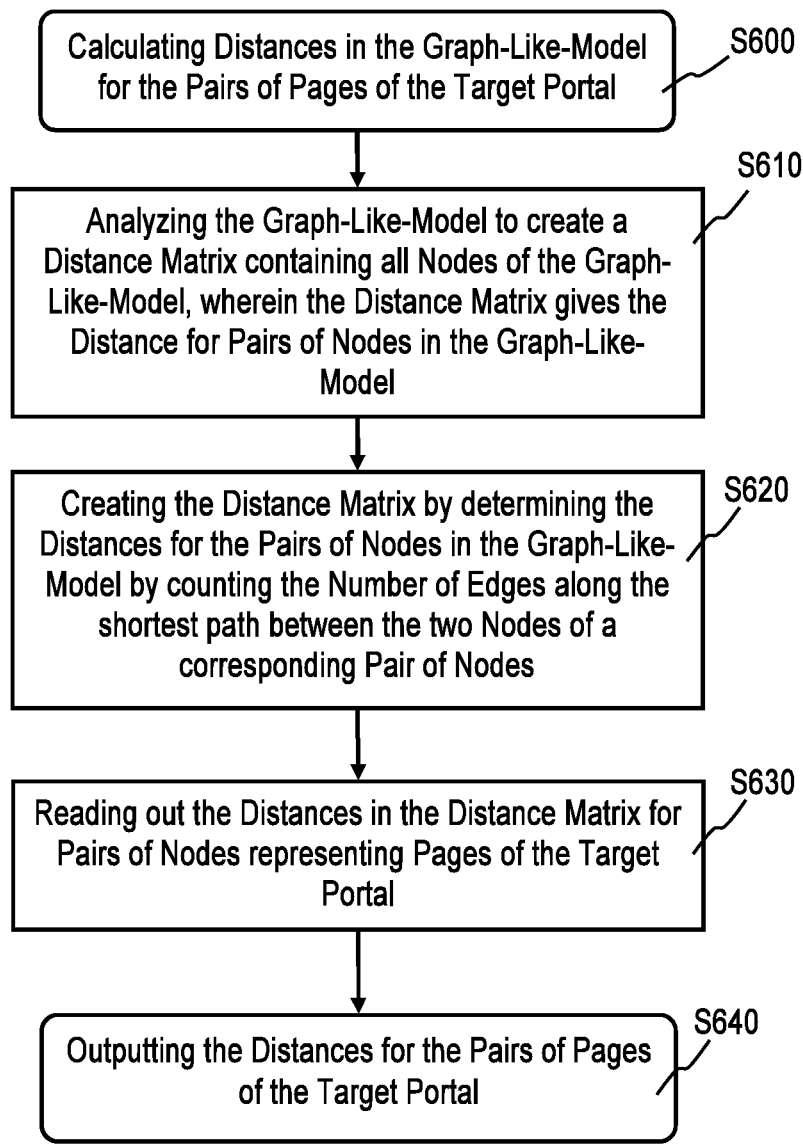
FIG. 8 is a schematic flow diagram of a process for calculating distances in the graph-like-model for pairs of pages of the target portal used by the method for user navigation in a target portal of FIGS. 3 and 4, in accordance with an embodiment of the present invention.

FIGS. 3 and 4 show together one example of a method for user navigation in a target portal, in accordance with an embodiment of the present invention; FIG. 5 shows a process for computing a graph-like-model 9 used by the method for user navigation in a target portal of FIGS. 3 and 4; FIG. 6 shows a process for defining a page-specific threshold used by the method for user navigation in a target portal of FIGS. 3 and 4; FIG. 7 shows a schematic flow diagram of a process for defining a user- and page-specific threshold used by the method for user navigation in a target portal of FIGS. 3 and 4; and FIG. 8 shows a process for calculating distances in the graph-like-model 9 for pairs of pages 12, 14, 16 of the target portal 10 used by the method for user navigation in a target portal of FIGS. 3 and 4.

Figure 13:
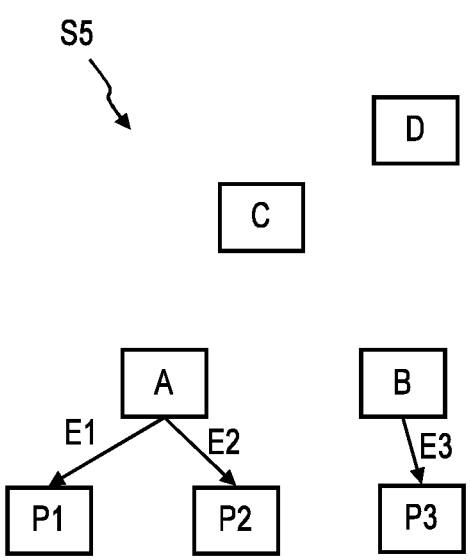
Figure 14:
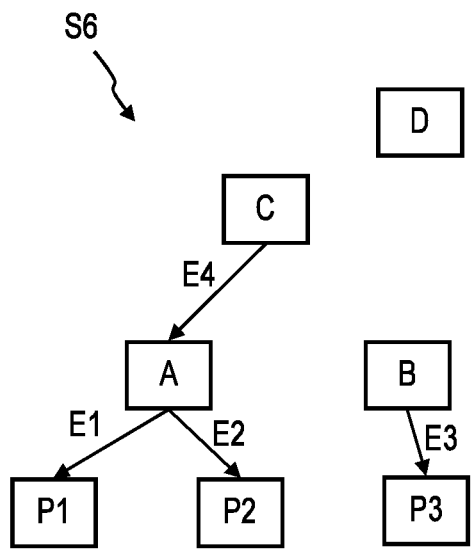
Figure 15:
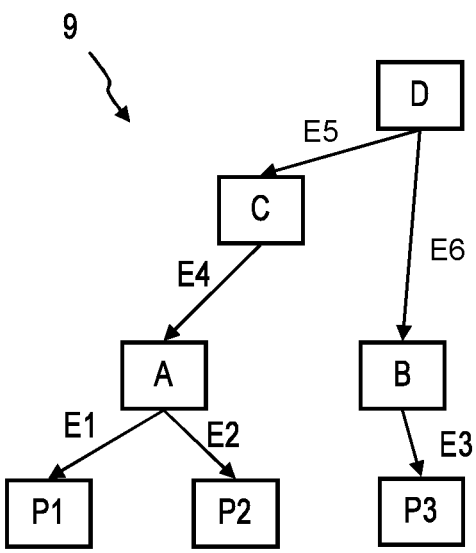
FIG. 15 is a schematic diagram of the graph-like-model, in accordance with an embodiment of the present invention.

FIGS. 9 to 14 show different states of the graph-like-model 9 during the creating process, and FIG. 15 shows the final state of the graph-like-model 9.

Referring to FIGS. 3 to 8, in step S100 the navigation component 100 creates at least one query including uniform resource locators (URLs) of selected portal pages 12, 14, 16 and/or content of selected portal pages 12, 14, 16 as search terms in a first search level. For the hyperlink structure 7 of FIG. 2, the navigation component 100 would create in the first search level search queries for each of the three portal pages 12, 14, 16.

In step S110 the navigation component 100 issues the at least one query to the web search engine 5. The web search engine 5 executes the at least one search query and returns a set of uniform resource locators (URLs) of extern web pages W1, W2, W3, W4 that contain the search terms as part of the page content. In step S120 the navigation component 100 receives and analyzes search results of the at least one query including external websites W1, W2, W3, W4 containing search terms as part of their content. For the hyperlink structure 7 of FIG. 2, the navigation component 100 would receive uniform resource locators (URLs) of the first and second extern web page W1 and W2 in the first search level.

In step S130 the navigation component 100 selects a set of uniform resource locators (URLs) from the received search results. For the hyperlink structure 7 of FIG. 2, the navigation component 100 would select the uniform resource locators (URLs) of the first and second external websites W1, W2.

Figure 9:
FIGS. 9 to 14 are different states of the graph-like-model during the creating process of the graph-like-model according to FIGS. 1 and 3, in accordance with an embodiment of the present invention.

In step S140 the navigation component 100 creates a node A, B, C, D in the graph-like-model 9 for each selected uniform resource locator (URL) if not already contained in the graph-like-model 9 and associates the node A, B, C, D with the selected uniform resource locator (URL). For the hyperlink structure 7 of FIG. 2, the navigation component 100 would create a first node A associated to the uniform resource locator (URL) of the first extern web page W1 and a second node B associated to the uniform resource locator (URL) of the second extern web page W2 in the graph-like-model 9, as shown in FIG. 9, displaying a first state S1 of the creating process of the graph-like-model 9.

In step S150 the navigation component 100 checks if the abort criterion is reached. If the abort criterion is not reached, the navigation component 100 continues with step S160. In step S160 the navigation component 100 creates a further search query including selected uniform resource locators (URLs) of the external websites W1, W2, W3, W4 in an additional search level. The navigation component 100 repeats steps S110 to S150 and issues the query to the web search engine 5 in step S110. The certain abort criterion is defined by a maximum number of nodes A, B, C, D in the graph-like-model 9 and/or a maximum number of processed search levels, for example.

Figure 10:
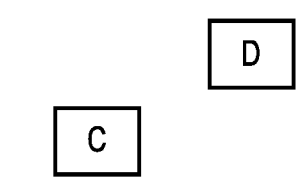
Figure 10:
Figure 11:
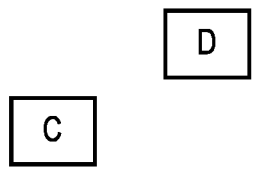
Figure 11:

For the hyperlink structure 7 of FIG. 2, the navigation component 100 continues with a second search level and creates in step S160 a further search query including selected uniform resource locators (URLs) of the external websites W1, W2. The navigation component 100 repeats steps S110 to S150 and issues the query to the web search engine 5 in step S110. In step S120 the navigation component 100 would receive uniform resource locators (URLs) of the third and fourth extern web page W3 and W4 in the second search level. In step S130 the navigation component 100 would select the uniform resource locator (URLs) of the third and fourth external website W3, W4. In step S140 the navigation component 100 would create a third node C associated to the uniform resource locator (URL) of the third extern web page W3 and a fourth node D associated to the uniform resource locator (URL) of the fourth extern web page W4 in the graph-like-model 9, as shown in FIG. 10, displaying a second state S2 of the creating process of the graph-like-model 9. In step S150 the navigation component 100 checks again if the abort criterion is reached. Since the abort criterion is not reached, the navigation component 100 continues with step S160 and creates a further search query including selected uniform resource locators (URLs) of the external website W3 in an additional search level. The navigation component 100 repeats steps S110 to S150 and issues the query to the web search engine 5 in step S110. In step S120 the navigation component 100 would receive uniform resource locator (URL) of the fourth extern web page W4 in the third search level. In step S130 the navigation component 100 would select the uniform resource locator (URL) of the fourth external website W4. In step S140 the navigation component 100 would create no new node, since the fourth node D in the graph-like-model 9 is already representing website W4. This third state S3 of the creating process of the graph-like-model 9 is shown in FIG. 11. In step S150 the navigation component 100 checks again if the abort criterion is reached. Since the abort criterion of three search levels, for example, is now reached, the navigation component 100 continues with step S200.

In step S200 navigation component 100 computes the graph-like-model 9 containing nodes A, B, C, D, P1, P2, P3 and edges E1 to E6 representing direct or indirect references between the external websites W1, W2, W3, W4 and portal pages 12, 14, 16 of the target portal 10 based on the created nodes A, B, C, D. In step S210 the navigation component 100 defines a threshold value for a maximum distance for pairs of portal pages 12, 14, 16 in the graph-like-model 9. In step S220 the navigation component 100 calculates distances in the graph-like-model 9 for the pairs of portal pages 12, 14, 16 of the target portal 10 and in step S230 the navigation component 100 compares the calculated distances for the pairs of portal pages 12, 14, 16 with the defined threshold value. In step S240 the navigation component 100 creates an additional navigation path for pairs of portal pages 12, 14, 16 whose distance is smaller than the threshold value; and in step S250 displays the additional navigation path in the target portal 10.

Referring to FIG. 5, the navigation component 100 starts the computing of the graph-like-model 9 in the shown embodiment in step S300. In step S310 the external content and link analysis component 110 of the navigation component 100 requests for each node A, B, C, D in the graph-like-model 9 a page represented from the node A, B, C, D from the extern web site W1, W2, W3, W4 according to a uniform resource locator URL that is associated with the node A, B, C, D. In step S320 the external content and link analysis component 110 parses a markup of a corresponding page and identifies links contained in the page markup. In steps S330, S340 and S350 the external content and link analysis component 110 checks a corresponding reference for each identified link. In case the link references a page 12, 14, 16 of the target portal 10 step S340 goes to step S360 and a corresponding node P1, P2, P3 is created in the graph-like-model 9 in step S360 and in step S370 an edge E1 to E3 is created between an actual node A, B, C, D and the node P1, P2, P3 the link L1 to L3 references to. In case the link references no page 12, 14, 16 of the target portal 10, step S340 goes to step S350. In step S350 the external content and link analysis component 110 checks if the link references one of the nodes A, B, C, D in the graph-like-model 9. If the link references no node A, B, C, D in the graph-like-model 9, the external content and link analysis component 110 gets the next link in step S365. In case the link L4 to L6 references a node A, B, C, D of the graph-like-model 9, an edge E4 to E6 is created between an actual node A, B, C, D and the node A, B, C, D the link L1 to L3 references to, in step S370. If not all links L1 to L6 are checked, step S375 branches to step S365 which gets the next link L1 to L6. If all links L1 to L6 are checked it is checked in step S380 if all nodes A, B, C, D are processed. If not all nodes A, B, C, D of the graph-like-model 9 are processed, step S380 branches to step S385 which gets the next node A, B, C, D. If all nodes A, B, C, D are processed, the graph-like-model 9 is outputted in step S390.

Figure 12:
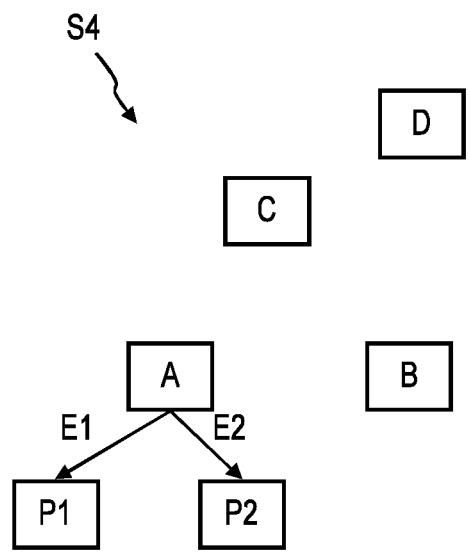

For the hyperlink structure 7 of FIG. 2, the external content and link analysis component 110 processes the first node A representing the first external website W1 according to steps S310 and S320. Since the identified first link L1 of the first external website W1 references the first portal page 12, a fifth node P1 is created in the graph-like-model 9 in step S350, and a corresponding first edge E1 between the first node A and the fifth node P1 is created in step S370. Since the identified second link L1 of the first external website W1 references the second portal page 14, a sixth node P2 is created in the graph-like-model 9 in step S350, and a corresponding second edge E1 between the first node A and the sixth node P2 is created in step S370. FIG. 12 shows a fourth state S4 of the graph-like-model 9 after processing the first node A.

After processing the first node A, the external content and link analysis component 110 processes the second node B representing the second external website W2 according to steps S310 and S320. Since the identified third link L3 of the second external website W2 references the third portal page 16, a seventh node P3 is created in the graph-like-model 9 in step S350, and a corresponding third edge E3 between the second node B and the seventh node P3 is created in step S370. FIG. 13 shows a fifth state S5 of the graph-like-model 9 after processing the second node B.

After processing the second node B, the external content and link analysis component 110 processes the third node C representing the third external website W3 according to steps S310 and S320. Since the identified fourth link L4 of the third external website W3 references the first external website W1 a corresponding fourth edge E4 between the third node C and the first node A is created in step S370. FIG. 14 shows a sixth state S6 of the graph-like-model 9 after processing the third node C.

After processing the third node C, the external content and link analysis component 110 processes the fourth node D representing the fourth external website W4 according to steps S310 and S320. Since the identified fifth link L5 of the fourth external website W4 references the third external website W3 a corresponding fifth edge E5 between the fourth node D and the third node C is created in step S370. Since the identified sixth link L6 of the fourth external website W4 references the second external website W2 a corresponding sixth edge E6 between the fourth node D and the second node B is created in step S370. FIG. 15 shows a final state of the graph-like-model 9 after processing the fourth node D.

Referring to FIG. 6, the navigation component 100 starts the defining of a page-specific threshold in the shown embodiment in step S400. In step S410 a page weight is determined by calculating a usage statistics for the pages 12, 14, 16 of the target portal 10. In step S420 the page-specific threshold is defined as a function of the page weight. In step S430 the page-specific threshold is outputted.

Alternatively to the page-specific threshold, the navigation component 100 can define a user- and page-specific threshold as shown in FIG. 7. Referring to FIG. 7, the navigation component 100 starts the defining of the user- and page-specific threshold in step S500. In step S510 a page weight is determined by calculating a usage statistics for the portal pages 12, 14, 16 of the target portal 10 for a specific user or user group. In step S520 the user- and page-specific threshold is defined as a function of the page weight. In step S530 a weight table is created giving each page 12, 14, 16 of the target portal 10 a user or user group specific weight, wherein each weight is associated with either a single user or a specific group of users. The page-specific threshold is outputted in step S540.

Referring to FIG. 8, the external content and link analysis component 110 of navigation component 100 starts the calculating of distances in the graph-like-model 9 for pairs of pages 12, 14, 16 of the target portal 10 in the shown embodiment in step S600. In step S610 the graph-like-model 9 shown in FIG. 15 is analyzed to create a distance matrix containing all nodes A, B, C, D, P1, P2, P3 of the graph-like-model 9, as shown below. The distance matrix gives the distances for pairs of nodes in the graph-like-model 9. In step S620 the external content and link analysis component 110 uses, e.g., a prior art Johnson's algorithm or a prior art Floyd-Warshall algorithm to calculate the distance matrix for the graph-like-model 9, for example. The distance matrix gives the distance counted in the number of edges in the shortest path between pairs of nodes in the graph-like-model 9.

|    | P1 | P2 | P3 | A | B | C | D |
|----|----|----|----|---|---|---|---|
| P1 | —  | 2  | 5  | 1 | 4 | 2 | 3 |
| P2 | 2  | —  | 5  | 1 | 4 | 2 | 3 |
| P3 | 5  | 5  | —  | 4 | 1 | 3 | 2 |
| A  | 1  | 1  | 4  | — | 3 | 1 | 1 |
| B  | 4  | 4  | 1  | 3 | — | 2 | 1 |
| C  | 2  | 2  | 3  | 1 | 2 | — | 1 |
| D  | 3  | 3  | 2  | 1 | 1 | 1 | — |

Distance Matrix

The distances in the distance matrix are read out for pairs of nodes P1, P2, P3 representing pages 12, 14, 16 of the target portal 1 in step S630 and outputted in step S640. Referring to the distance matrix above for the nodes P1 and P2 a distance of 2 can be read out. For the nodes P1 and P3 a distance of 5 can be read out. For the nodes P2 and P3 a distance of 5 can be read out. If the threshold is set to a maximum distance of 3, for example, an additional navigation path is implemented only between the first portal page 12 and the second portal page 14, since the distance between the fifth and sixth node P1, P2 is below the threshold of 3. The distance between the fifth and seventh node P1 and P3 and the distance between the sixth and seventh node P2 and P3 are above the threshold, so no additional navigation paths are implemented between the first and third portal page 12, 16 and between the second and third portal page 24, 26.

In one or more aspects, the navigation component 100 automatically finds and analyzes relevant external web pages W1, W2, W3, W4 and adapts the portal navigation according to the results of the analysis. The navigation component 100 computes the graph-like-model 9 whose nodes A, B, C, D, P1, P2, P3 represent either a portal page 12, 14, 16 or an external web page W1, W2, W3, W4 and whose edges E1 to E6 represent references between pages. In other words this graph-like-model 9 represents direct and indirect references between portal pages 12, 14, 16 and external web pages W1, W2, W3, W4.

For each pair of portal pages 12, 14, 16 in the distance matrix, the navigation component 100 determines if the distance lies below a defined threshold value. If this is the case, it determines if there already exists a navigation path between this pair of portal pages 12, 14, 16. If this is not the case it creates a new navigation path between this pair of portal pages 12, 14. To dos so, it invokes a navigation model and application programming interface (API) 60 to update the portal navigation. The new navigation path is stored as part of the updated portal navigation model in the portal database 50. During subsequent page rendering, the portal 10 renders the updated portal navigation as part of the page 12, 14.

In further embodiments, the navigation component 100 calculates a metric for the popularity of a portal page 12, 14, 16 by counting the number of portal requests for this particular page 12, 14, 16. It then uses this metric as a weighting factor in some of the aspects described above. It stores the popularity metric in a weight table, giving each portal page 12, 14, 16 a weight.

In a further embodiment, the external content and link analysis component 110 of the navigation component 100 uses the page weight to select the uniform resource locators (URLs) of the target portal 10 in step S100, for example. The external content and link analysis component 110 selects those uniform resource locators (URLs) of the portal pages 12, 14, 16 whose weight lies above a defined threshold.

In another embodiment, the navigation component 100 uses the page weight in step S240 to determine if a new portal navigation path should be created. The navigation component 100 calculates a weight dependent threshold, i.e. the higher the aggregated weight of the portal pages 12, 14, 16, the higher the threshold, and then creates the navigation path if the distance of the pair of portal pages 12, 14, 16 lies below this threshold.

In another embodiment, the external content and link analysis component 110 of the navigation component 100 calculates a user or user group specific popularity metric of a portal page 12, 14, 16, by counting the number of portal requests for this particular page 12, 14, 16 for a specific user or a user group. It stores the popularity metric in a weight table, giving each portal page a user or user group specific weight, i.e., a portal page 12, 14, 16 is assigned a set of multiple weights, where each weight is associated with either a single user or a specific group of users.

This allows performing user specific portal navigation improvement, i.e., the navigation paths are created specifically for a user or a group of users. In step S240, the external content and link analysis component 110 of the navigation component 100 calculates a user specific weight dependent threshold and then creates the navigation path if the distance of the pair of Portal pages lies below this threshold. It then associates this navigation path with the user. During page rendering the portal 10 creates a markup for e.g., this navigation path only for the user associated with the navigation path.

In further embodiment, the navigation paths are created dynamically, e.g. during page rendering for the current portal request, for selected user groups, depending on portal state, on the referring web site, user behavior like e.g. the user's portal navigation history. In another embodiment, this navigation component 100 runs on a certain schedule to e.g. update the portal navigation once a day or once a week.

As described herein, a method for user navigation in a target portal and a corresponding facility for user navigation in a target portal are provided, which are able to improve user experience with internet portals and to simplify navigation within the target portal.

In an embodiment of the present invention, a method for user navigation in a target portal with at least two portal pages comprises: Creating at least one query including uniform resource locators (URLs) of selected portal pages and/or content of selected portal pages as search terms in a first search level, repeating the following steps until a certain abort criterion is reached: Receiving and analyzing search results of the at least one query including external websites, i.e. non-portal web sites, containing search terms as part of their content; selecting a set of uniform resource locators (URLs) from the received search results; creating a node in a graph-like-model for each selected uniform resource locator (URLs) if not already contained in the graph-like-model and associating the node with the selected uniform resource locator (URL); creating and issuing a further search query including selected uniform resource locators (URLs) of external websites in an additional search level.

In case the certain abort criterion is reached the following are performed: Computing the graph-like-model containing nodes and edges representing direct or indirect references between the external websites and portal pages of the target portal based on the created nodes; defining a threshold value for a maximum distance for pairs of portal pages in the graph-like-model; calculating distances in the graph-like-model for the pairs of portal pages of the target portal; comparing the calculated distances for the pairs of portal pages with the defined threshold value; creating an additional navigation path for pairs of portal pages whose distance is smaller than the threshold value; and displaying the additional navigation path in the target portal.

In further embodiments of the present invention, the certain abort criterion is defined by at least one of the following thresholds: Maximum number of nodes in the graph-like-model, and maximum number of processed search levels.

In further embodiments of the present invention, the content of selected portal pages in the at least one search term comprises one of the following: Page title, sub-title or keyword.

In further embodiments of the present invention, the following are performed to compute the graph-like-model: For each node in the graph-like-model, request a page represented from the node from the extern website according to the uniform resource locator (URL) that is associated with the node, parse a markup of a corresponding page, and identify links contained in the page markup.

In further embodiments of the present invention, a corresponding reference for each identified link is checked.

In further embodiments of the present invention, in case the link references a page of the target portal, a corresponding node is created in the graph-like-model and an edge is created between an actual node and the node the link references to.

In further embodiments of the present invention, in case the link references a node in the graph-like-model, an edge is created between an actual node and the node the link references to.

In further embodiments of the present invention, based on the graph-like-model, a distance matrix is created containing all nodes of the graph-like-model, wherein the distance matrix gives the distance for pairs of nodes in the graph-like-model.

In further embodiments of the present invention, the distance matrix is created by determining the distances for the pairs of nodes in the graph-like-model by counting a number of edges along a shortest path between two nodes of a corresponding pair of nodes.

In further embodiments of the present invention, page weights are determined by calculating usage statistics for pages of the target portal, and a page-specific threshold value is defined as a function of a corresponding page weight.

In further embodiments of the present invention, page weights are determined by calculating usage statistics for pages of the target portal and for a specific user or user group, and page- and user-specific threshold values are defined as a function of corresponding page weights.

In another embodiment of the present invention, a facility for user navigation in a target portal with at least two portal pages comprises a navigation component with an external content and a link analysis component for performing the method for user navigation in a target portal. The navigation component performs: Creating at least one query including uniform resource locators (URLs) of selected portal pages and/or content of selected portal pages as search terms in a first search level; and issuing the at least one query to at least one web search engine. The navigation component repeats the following until a certain abort criterion is reached: Receiving and analyzing search results including external web sites containing search terms as part of their content; selecting a set of uniform resource locators (URLs) from a returned search result; creating a node in a graph-like-model for each selected uniform resource locator (URLs) if not already contained in the graph-like-model and associating the node with the selected uniform resource locator (URL); creating and issuing a new search query including selected uniform resource locators (URLs) of external websites in an additional search level In case the certain abort criterion is reached the navigation component performs the following: Computing the graph-like-model containing nodes and edges representing direct or indirect references between the external websites and portal pages of the target portal based on the created nodes; defining a threshold value for a maximum distance between pairs of portal pages in the graph-like-model; calculating distances in the graph-like-model between the pairs of portal pages of the target portal; comparing the calculated distance with the defined threshold value; creating an additional navigation path between pairs of portal pages whose distance is smaller than the threshold value; and displaying the additional navigation path in the target portal.

In further embodiments of the present invention, the navigation component uses a markup parser to parse a markup of a corresponding page.

In another embodiment of the present invention, a data processing program for execution in a data processing system comprises software code portions for performing a method for user navigation in a target portal when the program is run on the data processing system.

In yet another embodiment of the present invention, a computer program product stored on a computer-usable medium, comprises computer-readable program means for causing a computer to perform a method for user navigation in a target portal when the program is run on the computer.

An idea of the invention is to improve the user experience in a portal, e.g., the navigation within the portal is simplified and the content structure of the portal pages is enhanced.

Embodiments of the present invention automatically enhance the portal user experience by improving navigation based on the analysis of relevant, remote (non-portal) content.

To improve the shortcomings and problems of prior art solutions, embodiments of the present invention are automatically enhancing the portal experience, by allowing users to profit from portal knowledge they are not aware of. Coming back to the example, the users who are not aware of expertise knowledge described on the external web site are supported by automatically adapted and improved portal navigation.

Embodiments of the present invention allow portals to automatically find relevant information represented in the link structure and use this information for improving the portal navigation and portal content. Therefore, the target portal is enabled to automatically improve its user experience.

Further embodiments of the present invention may add additional navigation elements ("shortcuts") to the target portal for easy navigation between different pages of the target portal.

Embodiments of the present invention may add wizard-like navigation to step forward and backward between the portal pages. These navigation elements can be highlighted for selected users or depending on the portal state, i.e. depending on a certain signal that indicate relevance of these pages for the current user.

The above, as well as additional purposes, features, and advantages of aspects of the present invention are apparent in the detailed written description.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining, by one or more processors, a set of addresses of web sites, wherein each website of the websites contains search terms comprising search results from at least one query;
    generating, by the one or more processors, a model, wherein the generating comprises creating a respective node in the model for each address of a selected set of uniform resource locators, based on the respective node not already being contained in the model and associating the respective node with the uniform resource locator, wherein the respective nodes comprise existing nodes in the model;
    requesting, by the one or more processors, for each respective node in the model, a page from a website associated with the respective node, based on the uniform resource locator associated with the respective node;
    parsing, by the one or more processors, a page markup of each page of the requested pages to identify one or more links contained in each page markup;
    checking, by the one or more processors, a reference of each identified link, to determine whether the identified link references a portal page or a given node of the existing nodes, wherein the referenced portal page and the referenced given node each comprise a referenced node of the identified link; and
    based on the checking, updating, by the one or more processors, the model by generating, in the model, for each identified link with a referenced node, an edge between the referenced node and the respective node.

2. The computer-implemented method of claim 1, further comprising:
    outputting, but the one or more processors, the updated model.

3. The computer-implemented method of claim 1, wherein the checking further comprises:
    based on determining that the identified link references a portal page, generating, by the one or more processors, a new node in the model, wherein the new node comprises the referenced node for the identified link.

4. The computer-implemented method of claim 1, wherein the checking further comprises:
    based on determining that the identified link does not reference a portal page, determining, by the one or more processors, if the identified link references an existing node; and
    based on determining that the identified link references an existing node, designating, by the one or more processors, the existing node the references node for the identified link.

5. The computer-implemented method of claim 1, wherein the checking further comprises:
- based on determining that the identified link does not reference a portal page, determining, by the one or more processors, if the identified link references an existing node; and
- based on determining that the identified link does not reference an existing node, selecting, by the one or more processors, a next identified link for determining whether the next identified link references the portal page or the given node.

6. The computer-implemented method of claim 2, further comprising:
- prior to the outputting, determining, by the one or more processors, that checking is complete for each of the identified links.

7. The computer-implemented method of claim 2, wherein the model and the updated model are graph-like models.

8. The computer-implemented method of claim 1, further comprising:
- defining a threshold value for a maximum distance for pairs of pages in the updated model;
- calculating distances in the model for the pairs of pages of the portal;
- comparing the calculated distances for the pairs of pages with the defined threshold value;
- creating an additional navigation path for pairs of pages whose distance is smaller than the threshold value; and
- displaying the additional navigation path in the portal.

9. The computer-implemented method of claim 1, further comprising:
- creating, by the one or more processors, a distance matrix containing nodes of the updated model, wherein the distance matrix gives the distances for pairs of nodes in the model.

10. The computer-implemented method of claim 1, further comprising:
- defining, by the one or more processors, a page-specific threshold based on pages represented by nodes comprising the updated model;
- determining, by the one or more processors, page weights for the pages based on calculating usage statistics for the pages;
- defining, by the one or more processors, the page-specific threshold as a function of the page weights; and
- outputting, by the one or more processors, the page-specific threshold.

11. The computer-implemented method of claim 10, further comprising:
- defining, by the one or more processors, a user-and-page-specific threshold based on pages represented by nodes comprising the updated model;
- determining, by the one or more processors, page weights for the pages based on calculating usage statistics for the pages for the user;
- defining, by the one or more processors, the user-and-page-specific threshold as a function of the page weights;
- generating, by the one or more processors, a weight table giving each page of the pages a user-specific weight, wherein each weight is associated with the user; and
- outputting, by the one or more processors, the user-and-page-specific threshold.

12. The computer-implemented method of claim 11, wherein the user is selected from the group consisting of: a single user and a group of users.

13. A computer program product comprising:
- a computer readable storage medium readable by one or more processors and storing instructions for execution by the one or more processors for performing a method comprising:
  - obtaining, by the one or more processors, a set of addresses of websites, wherein each website of the websites contains search terms comprising search results from at least one query;
  - generating, by the one or more processors, a model, wherein the generating comprises creating a respective node in the model for each address of a selected set of uniform resource locators, based on the respective node not already being contained in the model and associating the respective node with the uniform resource locator, wherein the respective nodes comprise existing nodes in the model;
  - requesting, by the one or more processors, for each respective node in the model, a page from a website associated with the respective node, based on the uniform resource locator associated with the respective node;
  - parsing, by the one or more processors, a page markup of each page of the requested pages to identify one or more links contained in each page markup;
  - checking, by the one or more processors, a reference of each identified link, to determine whether the identified link references a portal page or a given node of the existing nodes, wherein the referenced portal page and the referenced given node each comprise a referenced node of the identified link; and
  - based on the checking, updating, by the one or more processors, the model by generating, in the model, for each identified link with a referenced node, an edge between the referenced node and the respective node.

14. The computer program product of claim 13, further comprising:
- outputting, but the one or more processors, the updated model.

15. The computer program product of claim 13, wherein the checking further comprises:
- based on determining that the identified link references a portal page, generating, by the one or more processors, a new node in the model, wherein the new node comprises the referenced node for the identified link.

16. The computer program product of claim 13, wherein the checking further comprises:
- based on determining that the identified link does not reference a portal page, determining, by the one or more processors, if the identified link references an existing node; and
- based on determining that the identified link references an existing node, designating, by the one or more processors, the existing node the references node for the identified link.

17. The computer program product of claim 13, wherein the checking further comprises:
- based on determining that the identified link does not reference a portal page, determining, by the one or more processors, if the identified link references an existing node; and
- based on determining that the identified link does not reference an existing node, selecting, by the one or more processors, a next identified link for determining whether the next identified link references the portal page or the given node.

18. The computer program product of claim 14, further comprising:

prior to the outputting, determining, by the one or more processors, that checking is complete for each of the identified links.

19. The computer program product of claim 14, wherein the model and the updated model are graph-like models.

20. A system comprising:

a memory;

one or more processors in communication with the memory;

program instructions executable by the one or more processors via the memory to perform a method, the method comprising:

obtaining, by the one or more processors, a set of addresses of websites, wherein each website of the websites contains search terms comprising search results from at least one query;

generating, by the one or more processors, a model, wherein the generating comprises creating a respective node in the model for each address of a selected set of uniform resource locators, based on the respective node not already being contained in the model and associating the respective node with the uniform resource locator, wherein the respective nodes comprise existing nodes in the model;

requesting, by the one or more processors, for each respective node in the model, a page from a website associated with the respective node, based on the uniform resource locator associated with the respective node;

parsing, by the one or more processors, a page markup of each page of the requested pages to identify one or more links contained in each page markup;

checking, by the one or more processors, a reference of each identified link, to determine whether the identified link references a portal page or a given node of the existing nodes, wherein the referenced portal page and the referenced given node each comprise a referenced node of the identified link; and based on the checking, updating, by the one or more processors, the model by generating, in the model, for each identified link with a referenced node, an edge between the referenced node and the respective node.

\* \* \* \* \*